United States Patent
Kim et al.

(10) Patent No.: US 8,271,554 B2
(45) Date of Patent: *Sep. 18, 2012

(54) ENCODING METHOD AND APPARATUS AND DECODING METHOD AND APPARATUS

(75) Inventors: Tae Hyeon Kim, Seoul (KR); Hyouk Jean Cha, Seoul (KR)

(73) Assignee: LG Electronics, Seoul (KR)

( * ) Notice: Subject to any disclaimer, the term of this patent is extended or adjusted under 35 U.S.C. 154(b) by 693 days.

This patent is subject to a terminal disclaimer.

(21) Appl. No.: 12/311,831

(22) PCT Filed: Oct. 19, 2007

(86) PCT No.: PCT/KR2007/005130
§ 371 (c)(1),
(2), (4) Date: May 19, 2009

(87) PCT Pub. No.: WO2008/048067
PCT Pub. Date: Apr. 24, 2008

(65) Prior Publication Data
US 2010/0042924 A1 Feb. 18, 2010

Related U.S. Application Data

(60) Provisional application No. 60/852,699, filed on Oct. 19, 2006, provisional application No. 60/852,698, filed on Oct. 19, 2006, provisional application No. 60/879,570, filed on Jan. 10, 2007, provisional application No. 60/907,809, filed on Apr. 18, 2007.

(51) Int. Cl.
*G06F 12/00* (2006.01)
*G06F 17/30* (2006.01)

(52) U.S. Cl. ........ 707/821; 707/913; 707/915; 707/916; 707/955; 715/716; 715/723; 715/810; 715/818

(58) Field of Classification Search .................. 707/736, 707/802, 805, 913, 915, 821, 916, 955; 715/716, 715/723, 810, 818
See application file for complete search history.

(56) References Cited

U.S. PATENT DOCUMENTS 5,835,671 A 11/1998 Kitamura et al.
(Continued)

FOREIGN PATENT DOCUMENTS

EP 1 089 572 4/2001
(Continued)

OTHER PUBLICATIONS

European Search Report dated Dec. 22, 2010 issued in corresponding European application No. 07833439.8.
(Continued)

*Primary Examiner* — Phong Nguyen
(74) *Attorney, Agent, or Firm* — Harness, Dickey & Pierce, P.L.C.

(57) ABSTRACT

The disclosed embodiments relate to a multimedia data encoding/decoding method and apparatus. In some aspects, a decoding method comprises receiving multimedia data which comprises a media area including a video data area having a plurality of video contents and an audio data area having a plurality of audio contents, a media information area including a plurality of video track areas respectively corresponding to the video contents and a plurality of audio track areas respectively corresponding to the audio contents, and a menu description area including description data for displaying a menu that provides an interface between a user and media data in the media area; displaying a menu using the description data; and decoding media data extracted from the media area based on the menu, wherein each of the video track areas and the audio track areas comprises at least one of temporal information and spatial information of a corresponding content, and the media area, the media information area and the menu description area are incorporated into a single file. The disclosed embodiments include a multimedia data encoding/ decoding method and apparatus can construct a multi media data file including a plurality of video/audio contents and description data for a menu between a user and media data. Thus, a time taken to process and transmit the multimedia data can be reduced.

14 Claims, 12 Drawing Sheets

U.S. PATENT DOCUMENTS

| | | | |
|---|---|---|---|
| 5,956,729 | A | 9/1999 | Goetz et al. |
| 6,360,234 | B2 | 3/2002 | Jain et al. |
| 6,369,835 | B1 | 4/2002 | Lin |
| 6,493,506 | B1 | 12/2002 | Schoner et al. |
| 6,523,046 | B2 | 2/2003 | Liu et al. |
| 6,941,324 | B2 | 9/2005 | Plastina et al. |
| 6,957,388 | B1 | 10/2005 | Taguchi et al. |
| 6,979,769 | B1 | 12/2005 | Majima et al. |
| 2001/0056471 | A1 | 12/2001 | Negishi et al. |
| 2002/0120634 | A1 | 8/2002 | Min et al. |
| 2002/0147740 | A1 | 10/2002 | Faraday et al. |
| 2002/0152318 | A1 | 10/2002 | Menon et al. |
| 2003/0025832 | A1* | 2/2003 | Swart et al. .................... 348/461 |
| 2003/0161425 | A1* | 8/2003 | Kikuchi ....................... 375/354 |
| 2004/0098398 | A1* | 5/2004 | Ahn et al. ..................... 707/100 |
| 2004/0103446 | A1 | 5/2004 | Yagi et al. |
| 2004/0109677 | A1 | 6/2004 | Seo et al. |
| 2004/0111673 | A1 | 6/2004 | Bowman et al. |
| 2004/0143590 | A1 | 7/2004 | Wong et al. |
| 2004/0160445 | A1 | 8/2004 | Whatmough |
| 2004/0167925 | A1 | 8/2004 | Visharam et al. |
| 2005/0005308 | A1 | 1/2005 | Logan et al. |
| 2005/0038813 | A1 | 2/2005 | Apparao et al. |
| 2005/0165846 | A1 | 7/2005 | Tsujii et al. |
| 2005/0193327 | A1 | 9/2005 | Chao et al. |
| 2005/0198570 | A1 | 9/2005 | Otsuka et al. |
| 2005/0201718 | A1 | 9/2005 | Kato |
| 2005/0207442 | A1* | 9/2005 | Zoest et al. .................... 370/465 |
| 2006/0004699 | A1 | 1/2006 | Lehikoinen et al. |
| 2006/0059190 | A1 | 3/2006 | Fukuoka et al. |
| 2006/0129909 | A1* | 6/2006 | Butt et al. .................... 715/500.1 |
| 2006/0130118 | A1 | 6/2006 | Damm |
| 2006/0140513 | A1 | 6/2006 | Tran Xuan et al. |
| 2006/0143235 | A1 | 6/2006 | Takaku |
| 2007/0107018 | A1* | 5/2007 | Song et al. ....................... 725/69 |
| 2007/0143664 | A1* | 6/2007 | Fang et al. ...................... 715/513 |
| 2007/0168046 | A1* | 7/2007 | Misawa et al. ..................... 700/1 |
| 2007/0186235 | A1* | 8/2007 | Jarman et al. ..................... 725/28 |
| 2007/0233725 | A1 | 10/2007 | Michmerhuizen et al. |
| 2007/0276864 | A1 | 11/2007 | Espelien |
| 2008/0101456 | A1* | 5/2008 | Ridge et al. ................ 375/240.01 |
| 2008/0294980 | A1 | 11/2008 | Thienot et al. |
| 2009/0003389 | A1* | 1/2009 | Joung et al. .................... 370/509 |
| 2010/0225808 | A1 | 9/2010 | Mears |

FOREIGN PATENT DOCUMENTS

| | | |
|---|---|---|
| EP | 1 496 701 | 1/2005 |
| EP | 1 583 099 | 10/2005 |
| EP | 1 624 680 | 2/2006 |
| EP | 1 626 351 | 2/2006 |
| JP | 2003-109361 | 4/2003 |
| JP | 2003-297015 | 10/2003 |
| JP | 2004-048396 | 2/2004 |
| JP | 2006-164260 | 6/2006 |
| WO | WO 99/20049 | 4/1999 |
| WO | WO 99/38098 | 7/1999 |
| WO | WO 03/073770 | 9/2003 |
| WO | WO 2004/088654 | 10/2004 |
| WO | WO 2004/100158 | 11/2004 |
| WO | WO 2005/034092 | 4/2005 |
| WO | WO 2005/039131 | 4/2005 |
| WO | WO 2005/066938 | 7/2005 |

OTHER PUBLICATIONS

Office Action for corresponding U.S. Appl. No. 12/311,828 dated Apr. 26, 2011.

Notice of Allowance for corresponding Korean Application No. 10-2009-7010175 dated Apr. 26, 2011.

Office Action for corresponding U.S. Appl. No. 12/311,835 dated May 27, 2011.

Office Action for corresponding U.S. Appl. No. 12/311,834 dated Jul. 11, 2011.

Search Report for corresponding European Application No. 07833437.2 dated Oct. 5, 2010.

USPTO Office Action dated Sep. 20, 2011 for U.S. Appl. No. 12/309,107.

USPTO Office Action dated Sep. 26, 2011 for U.S. Appl. No. 12/311,828.

Search Report for corresponding European Application No. 07833438.0 dated Oct. 27, 2010.

Search Report for corresponding European Application No. 07833436.4 dated Nov. 5, 2010.

Office Action for corresponding U.S. Appl. No. 12/311,835 dated Nov. 15, 2011.

Office Action for corresponding U.S. Appl. No. 12/309,107, dated Feb. 2, 2012.

Japanese Office Action mailed Feb. 7, 2012 for Japanese Application No. 2009-533251.

* cited by examiner

[Figure 1]
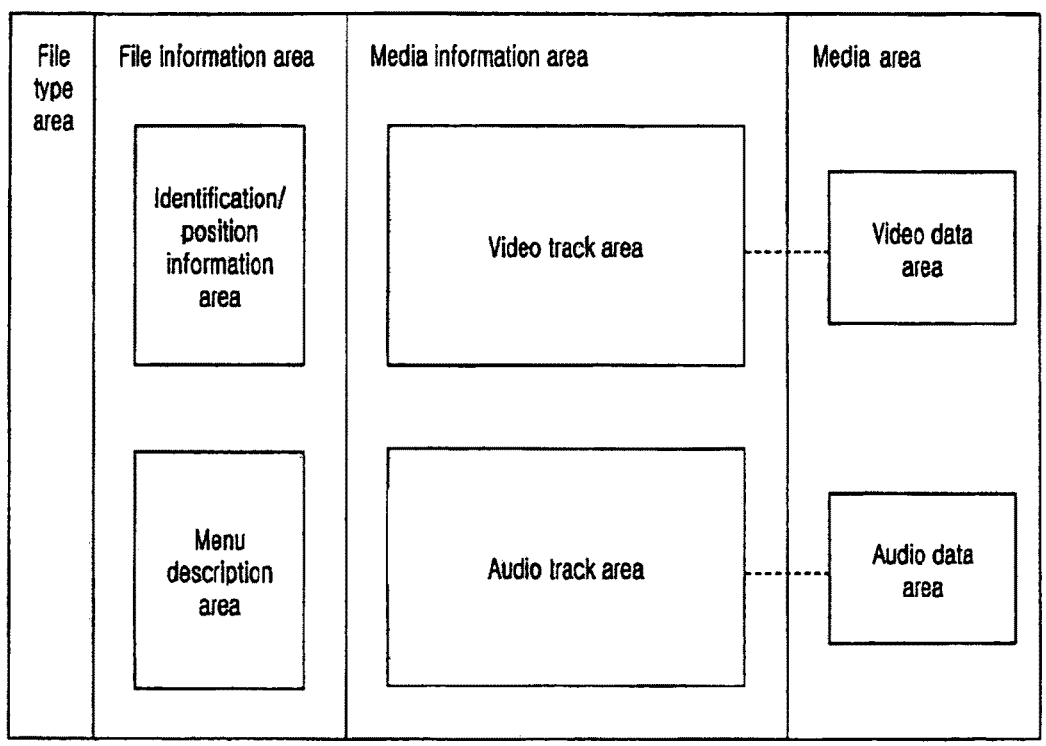

[FIG. 2]
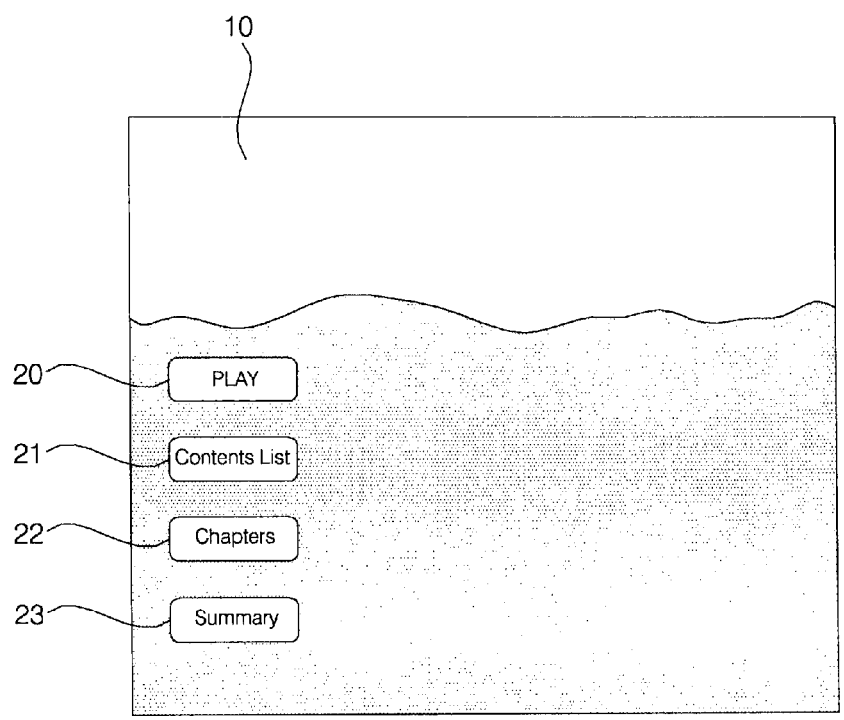

[ FIG. 3 ]
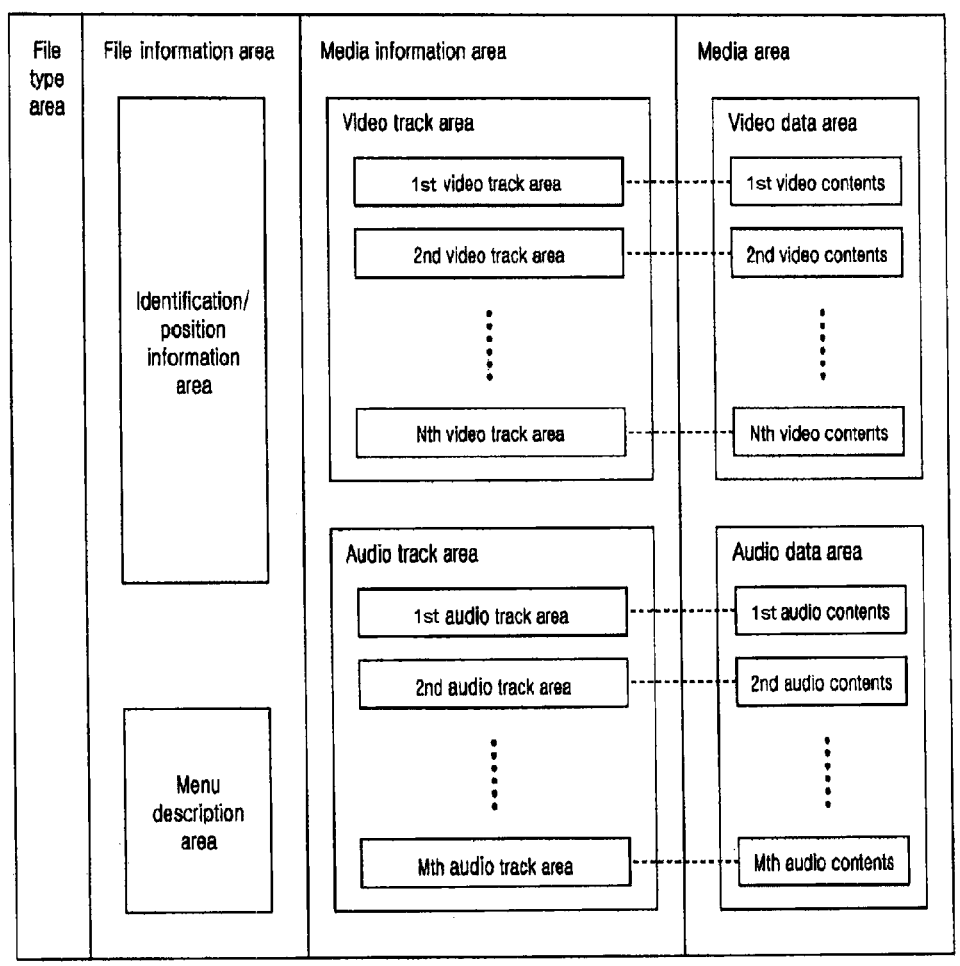

[Figure 4]
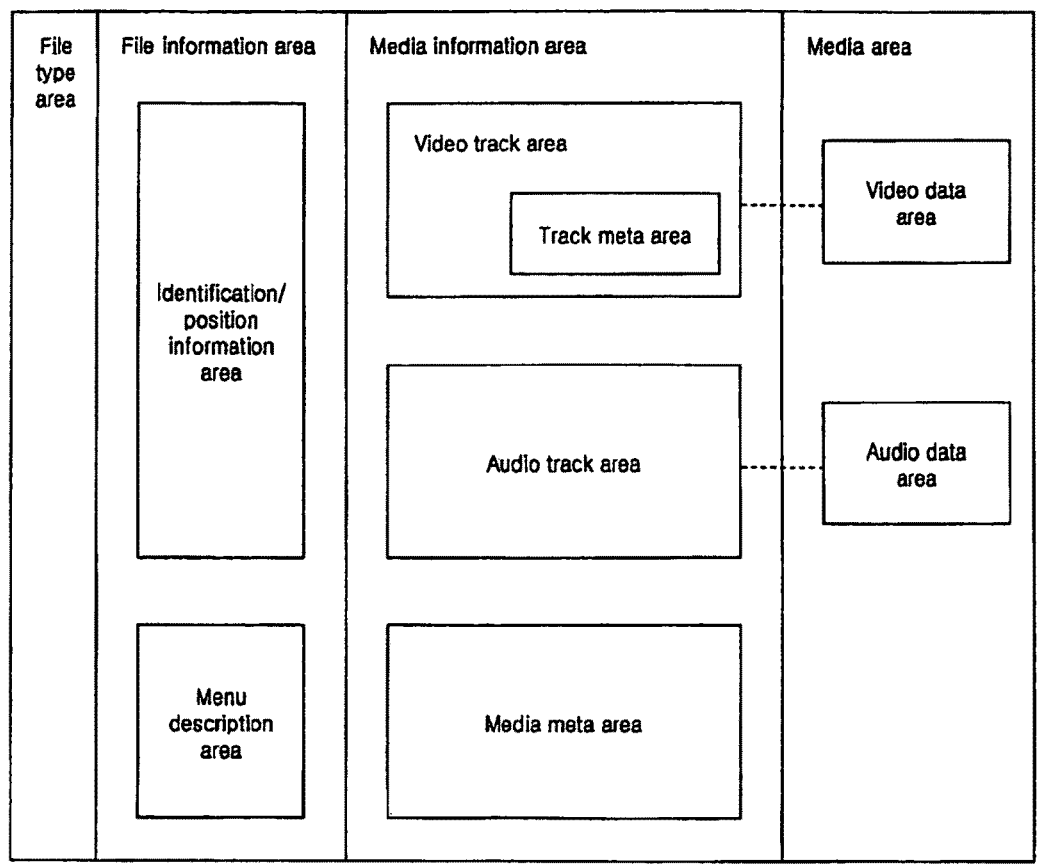

[Figure 5]
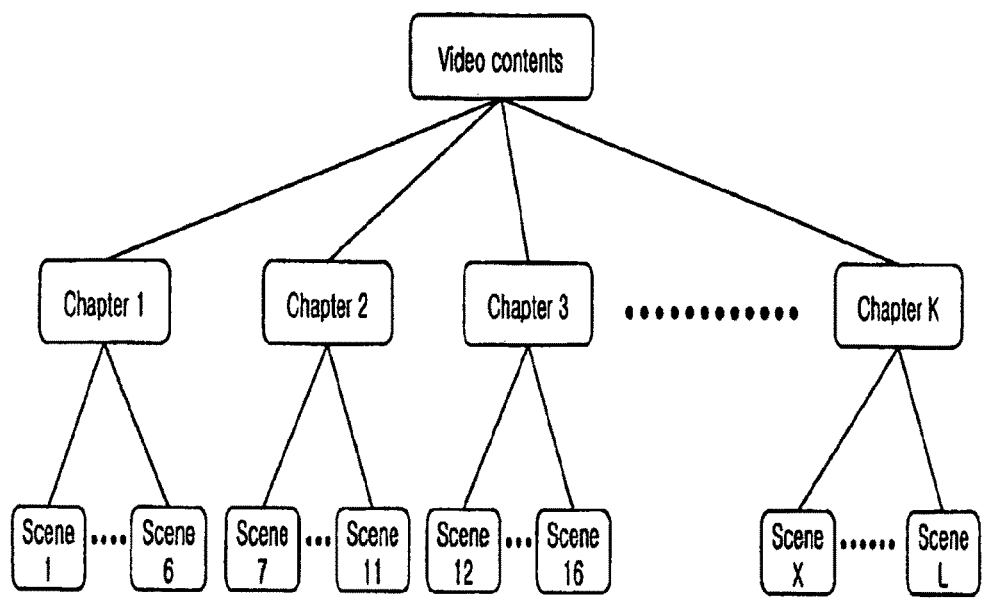
[Figure 6]
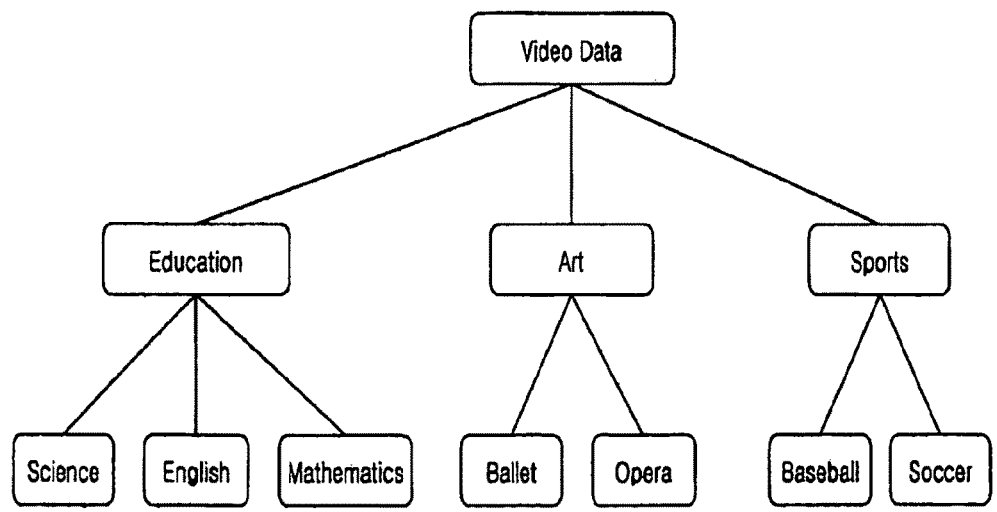

[Figure 7]
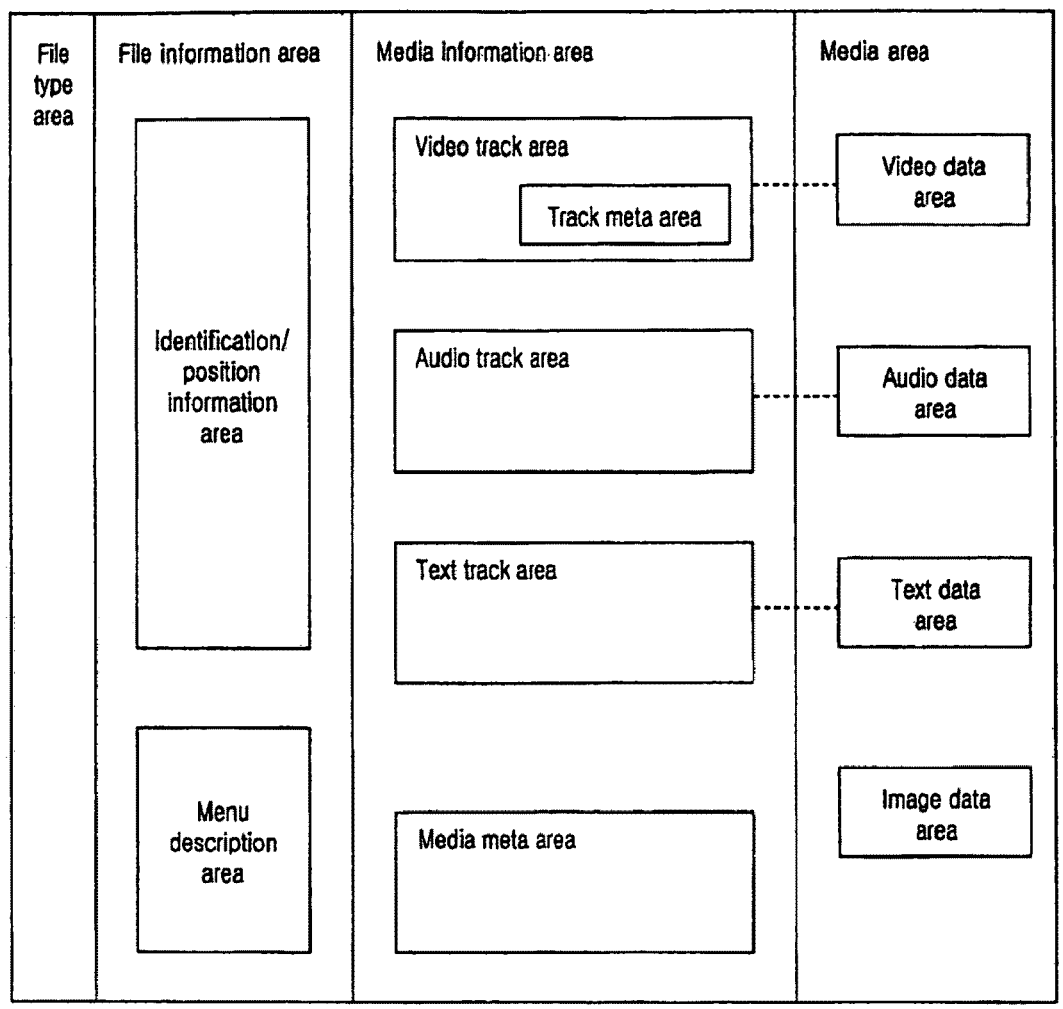

[Figure 8]
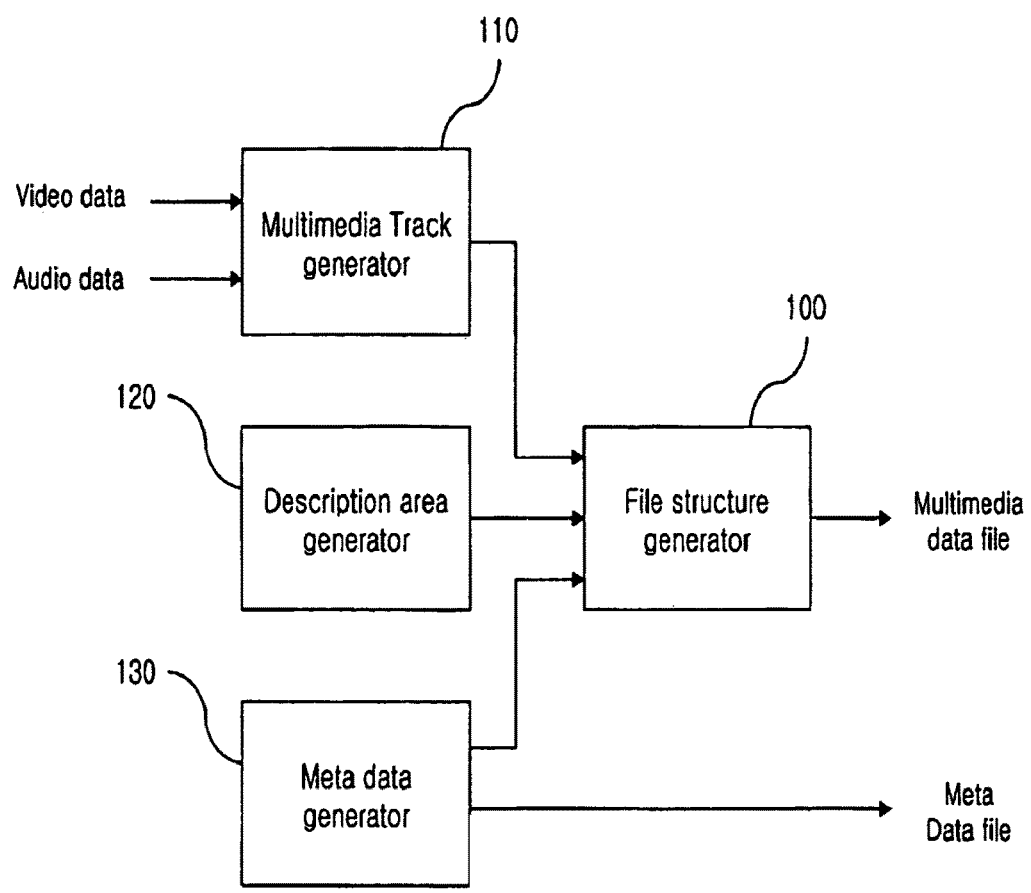

[Figure 9]
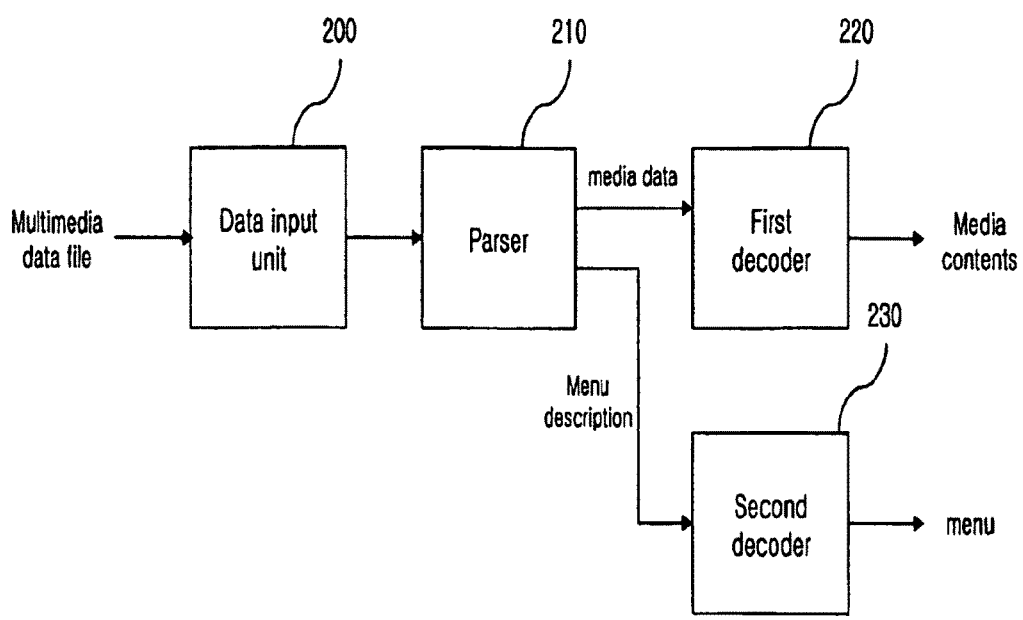

[Figure 10]
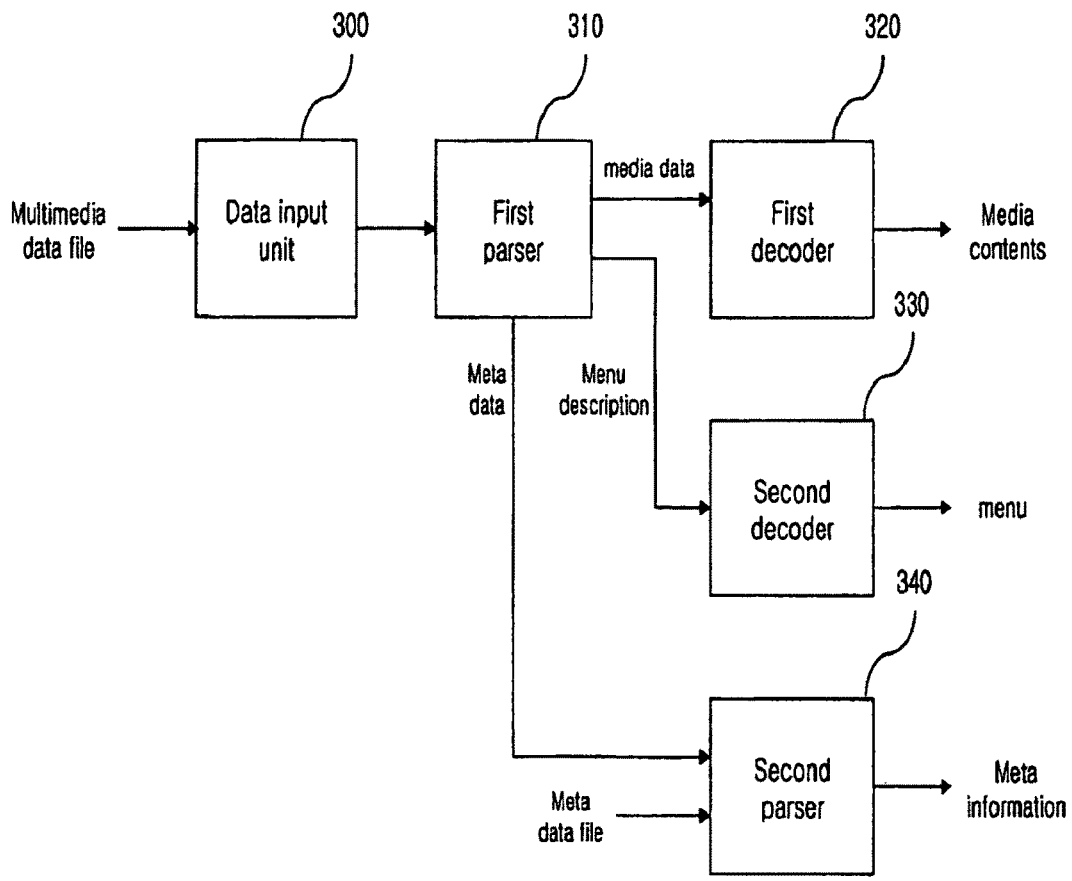

[ FIG. 11]
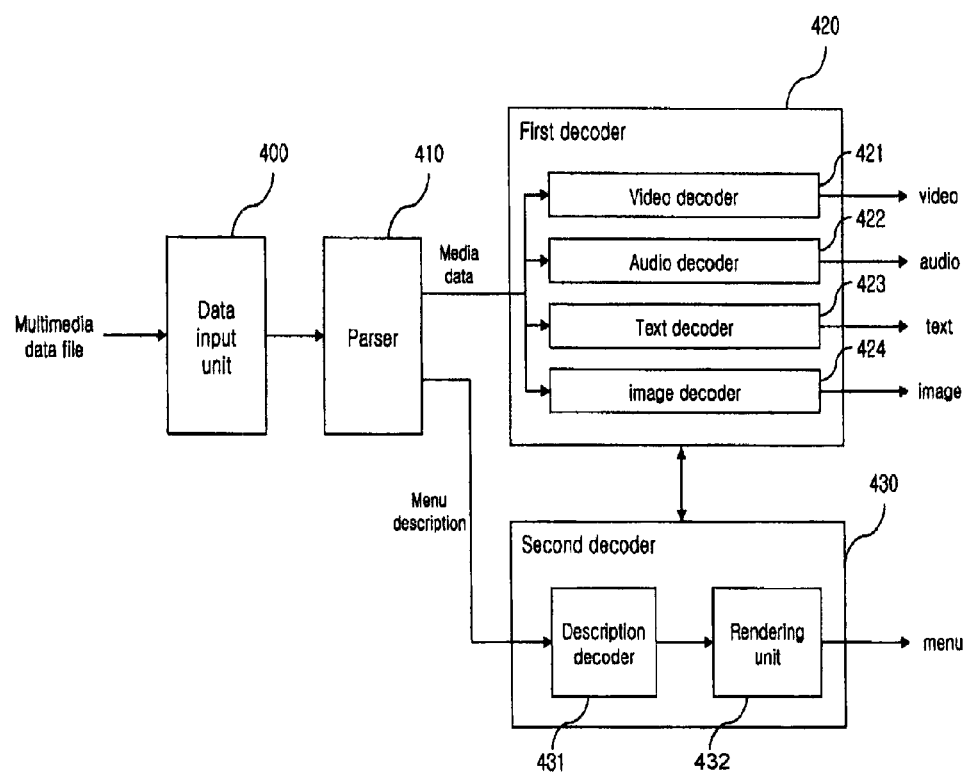

[Figure 12]
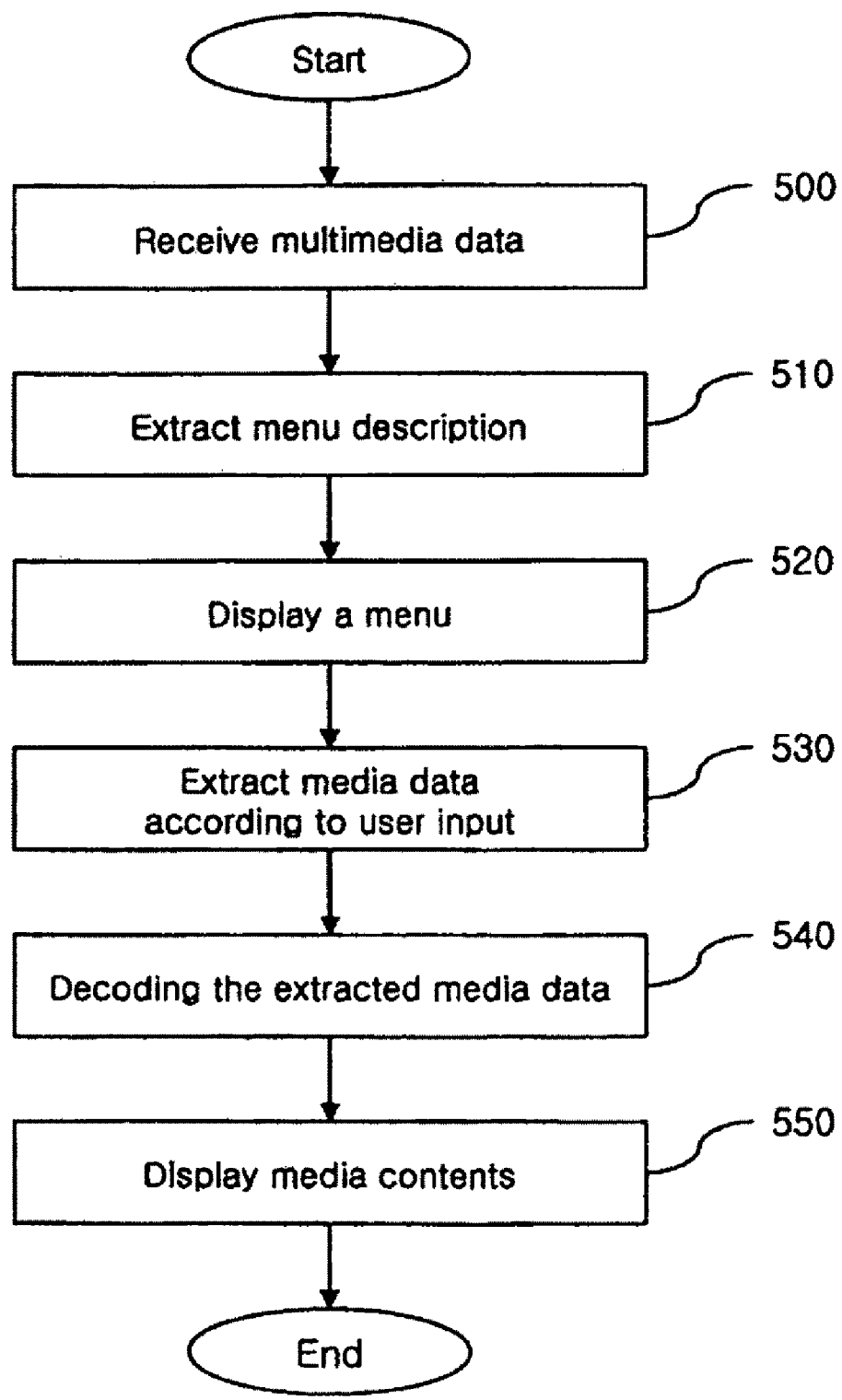

【Figure 13】
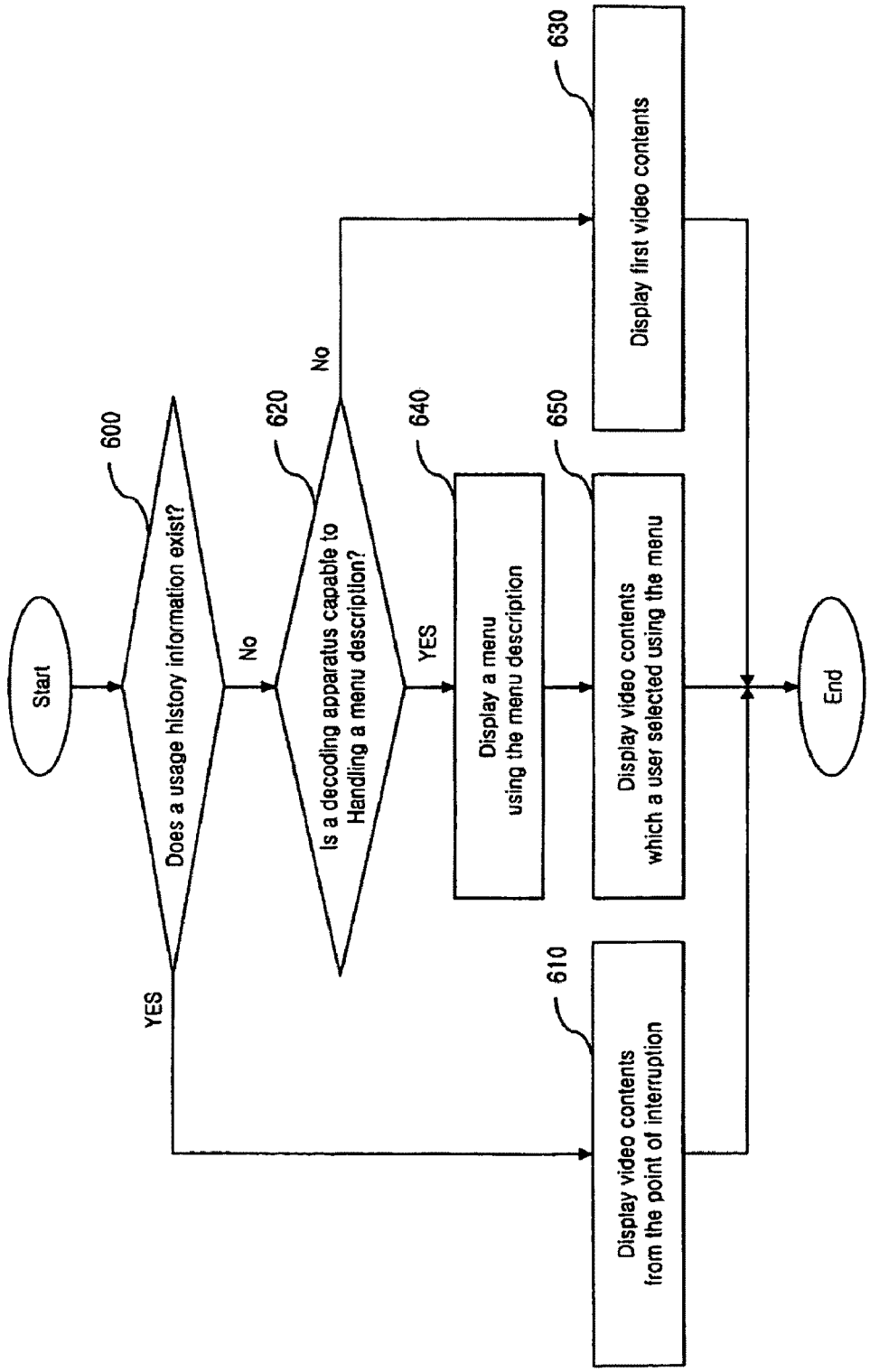

ENCODING METHOD AND APPARATUS AND DECODING METHOD AND APPARATUS

This application is a National Phase entry of PCT Application number PCT/KR2007/005130 filed on Oct. 19, 2007, which claims priority under 35 U.S.C. §§119(e), 120 and 365(c) to U.S. Provisional Application No. 60/852,699, filed on Oct. 19, 2006, U.S. Provisional Application No. 60/852,698, filed Oct. 19, 2006, U.S. Provisional Application No. 60/879,570, filed on Jan. 10, 2007, and U.S. Provisional Application No. 60/907,809, filed on Apr. 18, 2007, the disclosure of each of which is incorporated herein in its entirety by reference.

TECHNICAL FIELD

The present invention relates to a method and apparatus for encoding multimedia data including video data and audio data and a method and apparatus for decoding multimedia data including video data and audio data, and more particularly, to an encoding method and apparatus and a decoding method and apparatus which can enable a user to effectively manage and play a plurality of media contents, including a number of video contents, using a portable media player.

BACKGROUND ART

Multimedia data, including various types of media data such as video, audio and text data, is generally large in size. Thus, it generally takes a long time to encode/decode and transmit multimedia data. In addition, it is generally difficult to integrate and manage a considerable number of media contents.

DISCLOSURE OF INVENTION

Technical Problem

The present invention provides a multimedia data structure which can enable a plurality of media contents, including video contents, to be effectively managed and encoded/decoded, and also provides a method and apparatus for encoding multimedia data using the multimedia data structure and a method and apparatus for decoding multimedia data using the multimedia data structure.

Technical Solution

According to an aspect of the present invention, there is provided a decoding method. The decoding method comprises receiving multimedia data which comprises a media area including a video data area having a plurality of video contents and an audio data area having a plurality of audio contents, a media information area including a plurality of video track areas respectively corresponding to the video contents and a plurality of audio track areas respectively corresponding to the audio contents, and a menu description area including description data for displaying a menu that provides an interface between a user and media data in the media area; displaying a menu using the description data; and decoding media data extracted from the media area based on the menu, wherein each of the video track areas and the audio track areas comprises at least one of temporal information and spatial information of a corresponding content, and the media area, the media information area and the menu description area are incorporated into a single file.

According to another aspect of the present invention, there is provide an encoding method. The encoding method comprises generating a file type area including information regarding a format of a file; generating a media area which comprises a video data area including a plurality of video contents and an audio data area including a plurality of audio contents; generating a media information area which includes a plurality of video track areas respectively corresponding to the video contents and a plurality of audio track areas respectively corresponding to the audio contents respectively; and generating a file information area which comprises a menu description area including description data for displaying a menu, the menu providing an interface between a user and media data in the media area, wherein each of the video track areas and the audio track areas comprises at least one of temporal information and spatial information of a corresponding content, and the media area, the media information area and the menu description area are incorporated into a single file.

According to another aspect of the present invention, there is provide a decoding apparatus. The decoding apparatus comprises a data input unit which receives multimedia data which comprises a media area including a video data area having a plurality of video contents and an audio data area having a plurality of audio contents, a media information area including a plurality of video track areas respectively corresponding to the video contents and a plurality of audio track areas respectively corresponding to the audio contents, and a menu description area including description data for displaying a menu that provides an interface between a user and media data in the media area; a first decoder which displays a menu that provides a interface between a user and media data in the media area using the description data; and a second decoder which decodes a media data extracted from the media area based on the menu, wherein each of the video track areas and the audio track areas comprises at least one of temporal information and spatial information of a corresponding content, and the media area, the media information area and the menu description area are incorporated into a single file.

According to another aspect of the present invention, there is provide an encoding apparatus. The encoding apparatus comprises a multimedia track generator which generates a plurality of video track areas respectively corresponding to a plurality of video contents and a plurality of audio track areas respectively corresponding to a plurality of audio contents; a description area generator which generates a menu description area including description data for displaying a menu, the menu providing an interface between a user and media data; and a file structure generator which incorporates the video and audio track areas, and the menu description area into a single file, wherein each of the video and audio track areas comprises at least one of temporal information and spatial information of a corresponding content.

ADVANTAGEOUS EFFECTS

The disclosed embodiments include a multimedia data encoding/decoding method and apparatus can construct a multi media data file including a plurality of video/audio contents and description data for a menu between a user and media data. Thus, a time taken to process and transmit the multimedia data can be reduced.

BRIEF DESCRIPTION OF THE DRAWINGS

The above and other features and advantages of the present invention will become more apparent by describing in detail preferred embodiments thereof with reference to the attached drawings in which:

FIG. 1 illustrates the format of a multimedia data file according to an embodiment of the present invention;

FIG. 2 illustrates a menu which provides a user interface, according to an embodiment of the present invention;

FIGS. 3 and 4 illustrate the formats of multimedia data files according to other embodiments of the present invention;

FIG. 5 illustrates the format of chapter information present in segment metadata, according to an embodiment of the present invention;

FIG. 6 illustrates the format of summary information present in segment metadata, according to an embodiment of the present invention;

FIG. 7 illustrates the format of a multimedia data file according to another embodiment of the present invention;

FIG. 8 illustrates a block diagram of an apparatus for encoding multimedia data according to an embodiment of the present invention;

FIG. 9 illustrates a block diagram of an apparatus for decoding multimedia data according to an embodiment of the present invention;

FIG. 10 illustrates a block diagram of an apparatus for decoding multimedia data according to another embodiment of the present invention;

FIG. 11 illustrates a block diagram of an apparatus for decoding multimedia data according to another embodiment of the present invention;

FIG. 12 illustrates a flowchart of a method of decoding multimedia data according to an embodiment of the present invention; and FIG. 13 illustrates a flowchart of a method of decoding multimedia data according to another embodiment of the present invention.

BEST MODE FOR CARRYING OUT THE INVENTION

The present invention will hereinafter be described in detail with reference to the accompanying drawings in which exemplary embodiments of the invention are shown.

FIG. 1 illustrates a multimedia data format according to an embodiment of the present invention. Referring to FIG. 1, a multimedia data file may include a file type area, a file information area, a media information area, and a media area.

The file type area represents the format of the multimedia data file such as the type or version of the multimedia data file. For example, if the type of the multimedia data file is "mp42," the file type area may indicate that the multimedia data file has an MPEG4 version-2 format.

The media area may include a plurality of sub-media data areas such as a video data area and an audio data area. Each of the sub-media data areas includes media data.

The media area may also include a text data area having text data or an image data area having image data. The video data area may store video data including a plurality of video contents, and the audio data area may store audio data including a plurality of audio contents.

The media information area may include a plurality of track areas respectively corresponding to the sub-media data areas of the media area. Each of the track areas may include information (e.g., temporal/spatial information) regarding media data present in a corresponding sub-media data area.

Referring to FIG. 1, the media information area may include a video track area corresponding to the video data area and an audio track area corresponding to the audio data area.

The video track area may include temporal/spatial information regarding video data included in the video data area and metadata regarding the video data such as creation information regarding the video data (e.g., the titles of video contents included in the video data and the creators of video contents).

The audio track area may include temporal/spatial information regarding audio data included in the audio data area or metadata regarding the audio data such as creation information regarding the audio data (e.g., the titles, producers, singers and performers of audio contents).

The temporal/spatial information included in the video track area or the audio track area may be play section information, position information or size information of media data.

The file information area may include identification/position information area and a menu description area.

The identification/position information may include attribute information of each of a plurality of media data included in the media area, for example, identification information and position information of each of the plurality of media data.

More specifically, the identification/position information area may include name information, content type information, identification information, position information and size information of each of the plurality of media data included in the media area.

If the media area includes one video content and two audio contents, information included in the identification/position information area may be as indicated below:

| |
|---|
| item_ID = 1 (video 1) |
| item_name = <rel. uri to video 1> |
| content_type = video |
| item_ID = 2 (audio 1) |
| item_name = <rel. uri to audio 1> |
| content_type = audio |
| item_ID = 3 (audio 2) |
| item_name = <rel. uri to audio 2> |
| content_type = audio | where item_ID indicates an identifier of a media content, item_name indicates the name of a media content, and content_type indicates the type of a media content.

The identification/position information area may be divided into a first area and a second area and store part of media data attribute information in the first region and the rest of the media data attribute information in the second region. For example, the first region of the identification/position information area may include information regarding the name and the type of a media content, and the second region of the identification/position information area may include information regarding the position and size of a media content.

A handler type of the file information area may be designated as "1 srl."

Referring to FIG. 1, the menu description area includes menu description data for displaying a menu that provides an interface between a user and media data. In order to provide an interface that is more interesting and convenient to the user, an animation effect may be applied to the menu.

The menu displays a plurality of media contents present in the media area, and provides one or more input tools for allowing the user to select a media content to be played from the media contents. The user may identify and manage the media contents included in the media area using the menu.

The menu description data included in the menu description area and the media data included in the media area may be connected with reference to the information included in the identification/position information area.

FIG. 2 illustrates an example of the menu. Referring to FIG. 2, the menu includes a background image 10 and one or more input tools 20 through 23.

An animation effect may be applied to the background image 10 so as to visualize motion and thus to intrigue the user. For example, if user input is made using one of the input tools 20 through 23, an animation effect may be applied to the background image 10 so that the background image 10 can be modified in response to the user input.

Image data that can be used as the background image 10 may be stored in the media area.

A user may select one of the input tools 20 through 23 through a click of a mouse or a key input, and manage a plurality of media contents in the media area using the selected input tool.

For example, the user may identify a list of a plurality of media contents in the media area and select one of the media contents by using the input tool 21, i.e., 'Contents List.' Then, the user may play the selected media content by using the input tool 20, i.e., 'PLAY.'

In addition, the user may identify a number of chapters obtained by categorizing the media contents in the media area and select one of the chapters by using the input tool 22, i.e., 'Chapters'. Moreover, the user may obtain a brief description of each of the media contents in the media area by using the input tool 23, i.e., 'Summary.'

The input tools 20 through 23, however, are exemplary, and thus, the present invention is not restricted thereto. That is, the menu may include various types of input tools, other than those set forth herein, in order to provide the user with an interface capable of effectively interfacing between the user and multimedia contents.

Text data necessary for configuring the menu may be included in the menu description data of the menu description area or may be stored in the media area.

The menu description data may include graphics information regarding graphic elements, which are the visual elements of the menu, spatial layout information regarding the spatial layout of the visual elements, and temporal layout information regarding the temporal layout of media data to be displayed along with the menu. The information regarding the temporal layout of the media data may include synchronization information of the media data, animation effect information regarding an animation effect to be applied to the menu and interactive event information regarding an interactive event such as a click of a mouse or a key input that occurs between the user and the menu.

The menu description data may be created using LASeR (Light-weight Application Scene Representation), Scalable Vector Graphics (SVG) or Binary Format for Scene (BIFS). In this case, the menu description data may have an eXtensible Markup Language (XML) format or a binary encoded format.

An example of the menu description data created using LASeR is as follows:

```
<lsru:NewScene>
  <svg width="400" height="250" viewBox="0 0 400 250">
  <!-- Main menu -->
  <g id="title_page" visibility="visible">
  <!-- Background image -->
  <image id="title_image" xlink:href="#item_ID_of_image"
  width="400" height="250" x="0" y="0">
  <!-- Menu options -->
  <rect x="10" y="109" width="100" height="15" rx="8"
  fill="rgb(255, 150, 70)"/>
  <text id="play_btn" x="20" y="120" font-family="Verdana"
  font-size="12" fill="white">
    play </text>
  ...
  </g>
  <!-- Video playback -->
  <g id="video_playback" visibility="hidden">
    <video xlink:href="#item_ID_of_video" begin="play_btn.click"
  type="video/mpeg"...>
    <audio xlink:href="#item_ID_of_audio" begin="play_btn.click"
  type="audio/mpeg"...>
    <a xlink:href="#item_ID_of_text" begin="play_btn.click"
  type="text/3gpp"...>
  </g>
  ...
  </svg>
</lsru:NewScene>.
```

The menu description data created using LASeR may include Scalable Vector Graphics (SVG) format data as described in the above example.

The menu description data may include a plurality of elements for describing the graphics information, the animation effect information, the spatial layout information, the temporal layout information, and the interactive event information.

For example, the menu description data may include an element for graphic elements, text data and image data that are displayed along with the menu, an element for multimedia data, and an element for an animation effect to be applied to the menu.

The elements of the menu description data are as indicated by Table 1 below.

TABLE 1

| Effects | Description elements | Functionality |
|---|---|---|
| Element grouping | g | The g element is used for grouping of related graphics elements. |
| Text rendering | text | The text element is used for rendering text. For example, in Figure X, menu options and scrolling text are all rendered using the "text" element |
| Image referencing | image | The image element makes references to image data/file. |
| Video referencing | audio | The video element makes references to video data/file. |
| Audio referencing | video, | The audio element makes references to audio data/file. |
| Text referencing | a | The a element makes references to text data/file (e.g. subtitles) |
| Animation | animate | The animate element is used for animating a single attribute over a predefined time, e.g. cpacity control over time on a background image. |
|  | animateTransform | The animate Transform element animates an attribute on a target element over a predefined time, where attributes can be any of the following: translate, scale, rotate, skewX, and skewY. For example, in Figure X, the scrolling text (e.g. song title) is rendered using the animateTransform element. |

TABLE 1-continued

| Effects | Description elements | Functionality |
| --- | --- | --- |
| | animateColor | The animateColor element specifies a color transformation over a predefined time. |
| | animateMotion | The animateMotion element is used for allowing a referenced element to move along a predefined motion path over time. |
| Attribute control | set | The set element is used for setting the value of an attribute for a specified duration |
| Shapes & motion paths | path | The path element defines the outline of a shape (e.g. a star pattern). It can also be used for defining a motion path. |
| Basic shapes | rect<br>circle<br>ellipse<br>line | The basic shape elements are equivalent to the path element, except that they correspond to specific shapes. As an example, in the Portable video player MAF menu, the menu buttons can be constructed using the basic shape elements. |

The animation effect information included in the menu description data may include grouping information regarding a group of animation effects to be applied to the menu, size information of media data to which the animation effects are to be applied, opacity effect information and geometric transformation effect information. The size information may be information regarding a variation in the size of an image. The opacity effect information may be information regarding a fade-in effect and a fade-out effect. The geometric transformation effect information may be information regarding such effects as transitions between images, variations in the scale of an image, rotations, and skews.

An animation area may include motion path information regarding the path of the motion of an image or the path of the motion of an object in the image, color variation information regarding a variation in the color of the image, or shape information of the image. The shape information of the image may indicate whether the image is rectangular, circular, elliptical, polygonal, linear or polylinear. The animation area may also include attribute control information necessary for changing the attributes of media data for various animation effects that can be applied to the media data.

An example of the animation effect information, including opacity effect information, scale conversion information and size conversion information, is as follows:

```
<lsru:NewScene>
<svg>
<g id=Article_Image">
<animate attributeName="opacity"calcmode="linear"
    values="0.00:1.00:1.00:1.00:1.00:1.00:1.00:1.00"
    dur="8.0" repeatDur="indefinite"/>
<animate Transform attributeName="Transform"type="scale"
additive="sum"calcmode="linear"
    values="0.00 1.00:1.00 1.00:1.00 1.00:1.00 1.00:0.50 1.00:0.00
    1.00:1.00 1.00"
    dur="8.0"repeatDur="indefinite"/>
<image width="200"height="15-" #sampleID = 1>
</image>
</g>
</svg>
</lsru:NewScene>
``` where the symbol '<' indicates a start, the symbol '>' indicates an end, the symbol '/' indicates the end of context to be defined. For example, context between <svg> and </svg> may be defined as one group, context <g id="Article_image"> and </g> may be defined as another group, and context between <image width="200" height="150"# sample=1> and </image> may be defined as still another group. Referring to <g id="Article_image">, reference symbol g indicates a group, and Article_image indicates the name of the group g. Animation attributes or animation effect names "opacity" and "transform" respectively indicate an opacity effect and a geometric transformation effect. Symbol 'sum' indicates the summation of a number of animation attributes. Symbol 'dur' indicates the duration of play of image data.

If image data is considered as a sample, the width and height of an image realized by image data (#sampleID=1) having an identifier of 1 are 200 and 150, respectively. The above-mentioned animation effect involves linearly (calcMode="linear") varying the transparency of the image data (#sampleID=1) from a level of complete transparency (value=0.00) to its original transparency level (value=1.00) over eight seconds (dur="8.0") repeatedly (repeatDur="indefinite"). Also, the above-mentioned animation effect involves linearly (calcMode—"linear") transforming the scale ("transform", "scale") of the image data (#sampleID=1) from its original size (value=1.00) to half of its original size (value=y; x=1.00; 0.50) over eight seconds (dur="8.0") repeatedly (repeatDur="indefinite"). The above-mentioned animation effect is characterized by performing the variation of the transparency of the image data (#sampleID=1) and the transformation of the scale of the image data (#sampleID=1) at the same time (additive="sum").

Image data including one or more samples may be divided into a number of chunks, and a plurality of samples of each of the chunks may be arranged in a time order. Samples in a chunk have their own identification numbers that start from 1. In this regard, the image data (#sampleID=1) may be a sample having an identification number of 1, rather than being image data.

Referring to FIG. 3, a video data area or an audio data area may include a plurality of media contents, and a video track area or an audio track area may include a plurality of track areas respectively corresponding to the media contents.

In other words, the video data area may include data corresponding to N video contents, for example, main features, "making-of" clips, actor interviews or image galleries. The video track area may include N sub-video track areas respectively corresponding to the N video contents.

The audio data area may include data corresponding to M audio contents, and the audio track area may include M sub-audio track areas respectively corresponding to the M audio contents.

Each of the N sub-video track areas and the M sub-audio track areas may include temporal/spatial information or meta information regarding a media content.

Referring to FIG. 4, a media information area may include a media meta area or a track meta area for storing metadata regarding a plurality of media contents present in a media area. The media meta area may be included in the media information area on the same level as an audio track area and a video track area. The track meta area may be included in the video track area and the audio track area, respectively.

The metadata which may be included in the media meta area or in the track meta area of the video track area or of the audio track area may be used for providing additional information regarding the media contents to a user.

The metadata which may be described using a eXtensible Markup Language (XML) format.

The metadata may include creation information or chapter/summary information regarding the media contents or usage history information regarding the access of the media contents by the user.

The creation information may include the titles, producers, and clip descriptions of the media contents, the user's comments on the media contents, and file date/time information indicating the date and time when the media contents are included in a multimedia data file. The creation information may also include various information regarding the creation of the media contents and various attribute information regarding the media contents, such as information regarding the cast of a video content, the date of production of a video content, the singer of an audio content, and the performer of an audio content.

The creation information may be included in the media meta area or may be included in the track meta area of the video track area or of the audio track area. For example, general information regarding all of a plurality of video contents included in a video data area may be included in the media meta area, and detailed information regarding each of the video contents may be included in the video track area.

More specifically, the title of a movie included in a multimedia data file or information regarding the producer of the movie may be included in the media meta area, and the title of each of a plurality of video contents included in the movie or information regarding the producer of each of the video contents may be included in the video track area.

Likewise, creation information regarding a plurality of audio contents included in the audio data area may be included in the media meta area or in the track meta area of the audio track area.

Media data included in the media area may be classified hierarchically. The metadata regarding the media data included in the media area may include segment metadata for searching segments of the media data included in the media area. The segment metadata includes information regarding one or more segment groups which the segments are classified into.

Media data included in the media area may be classified hierarchically, and the segment metadata comprises information regarding the hierarchically classified chapters of the media content.

The user may easily search through the media data included in the media area using the segment metadata. For this, the hierarchical grouping information may be displayed along with the above-mentioned menu.

The segment metadata may be included in the media meta area, and the hierarchical grouping information of the segment metadata may be included in a track meta area of a corresponding media track area.

A plurality of video contents included in the video data area may be divided into a plurality of chapters, and the segment metadata may include chapter information regarding each of the chapters. For example, the segment metadata may include summary information of each of the chapters, information regarding a number of scenes classified into each of the chapters, and information regarding a representative scene or image of each of the chapters.

FIG. 5 illustrates the format of chapter information included in the segment metadata. Referring to FIG. 5, video contents may include L segments respectively corresponding to L scenes, and the L segments may be classified into K segment groups. For example L scenes may be grouped into K chapters.

Segment metadata may include the number of chapters (i.e., K), the indexes of the video contents, the positions of the video contents in video data, summary of each of the K segment groups, the indexes of one or more segments included in each of the K segment group, and summary of each of the L segments.

A user may easily determine the subject matter of video contents based on chapter information and may thus easily search for and play a video content of interest.

The L segments are illustrated in FIG. 5 as being classified into one layer of segment groups. However, the L segments may be classified into two layers of segment groups. In other words, two or more of the K segment groups may be regrouped into J segment groups. In this case, information regarding the regrouping of the K segment groups may be included in segment metadata.

A plurality of video contents included in a video data area may be classified into one or more groups according to their themes. In this case, segment metadata may include information regarding the groups, for example, summary information regarding the themes of the groups.

FIG. 6 illustrates the format of summary information included in the segment metadata. In this embodiment, video data in the video data area may be classified into seven segments having different themes.

Referring to FIG. 6, the themes of the seven segments are 'science,' 'English,' mathematics,' 'ballet,' opera, 'baseball,' and 'soccer.' Thus, the seven segments may be classified into three segment groups 'Education,' 'art,' and 'sports.'

In this case, segment metadata may include the number of segment groups (i.e., three), the indexes of the seven segments, and the themes of the seven segments.

Likewise, a plurality of image segments included in a video content may be classified into one or more image segment groups. In this case, segment metadata may include summary of each of the image groups.

A user may easily determine the subject matter of video contents based on segment metadata and may thus easily search for and play a video content with a theme of interest.

A plurality of segments of video data are illustrated in FIG. 6 as being classified into one layer of segment groups. However, the segments may be classified into two layers of segment groups. For example, the segment groups illustrated in FIG. 5 may be regrouped into one or more segment groups, and information regarding the regrouping of the three segment groups may be included in segment metadata.

Metadata may also include usage history information regarding actions made by a user on a plurality of media contents included in the media area. For example, the usage history information may be a statement regarding the access of the media contents by the user during a predefined period of time.

The usage history information may include various information regarding the access of media contents by the user such as identification information of a video content that has been viewed by the user, information regarding a point of interruption, if any, of the play of a video content, information regarding when the user starts and ends viewing a video content, or information regarding the number of times the user has viewed a video content.

If a multimedia file including a plurality of media contents is used by more than one user, usage history information may be generated for each of the users. In order to manage the usage history information for each of the users, the usage history information may be included in an additional metadata file, rather than in the multimedia data file.

A user may easily obtain information regarding the access of a plurality of media contents of a multimedia data file by the user using usage history information. More specifically, if the play of a video content included in a video data area is interrupted, a user may resume playing the video content from the point of interruption of the play of the video content.

FIG. 7 illustrates the format of a multimedia data file according to an embodiment of the present invention. Referring to FIG. 7, a media area may include a video data area and an audio data area. The media area may also include a text data area and/or an image data area. If the media area includes a text data area, a media information area may include a text track area corresponding to the text data area.

The text data included in the text data area may be text strings or lyrics.

Timed text may be obtained by reproducing text strings included in the text data area according to timing information included in the text track area. The text track area may include decoding time information, position information, and size information of the text strings included in the text data area.

Video contents included in the video data area may be reproduced in synchronization with a plurality of text strings using the timed text. Timed text may be used for providing subtitles in real time, for providing captions for people who do not have audio devices or have hearing problems, for providing karaoke services, or for scrolling news items or teleprompter applications.

In order to reproduce the timed text, a multimedia file may include character set information, glyph information, font information, text color information, closed caption information, dynamic highlight information, text rendering position information and text composition information.

Unicode 3.0 may be used to represent various languages and glyphs. UTF-8 and UTF-16 may be decoded into required characters. Fonts for decorating input strings may be specified by their names, sizes, and styles. The font styles may include bold, italic, and bold-italic. The colors of text and a background image may be represented by RGB values.

Text may be rendered within a specified region. The application for the foreign language exercise materials may use the imed text information to overlay text on an image. Text as in karaoke applications may be highlighted for emphasis.

The text data area may include a plurality of text samples, and each of the text samples may include a text string and a text modifier. The text modifier has at least one of style information, highlight information, closed caption information, dynamic highlight information and blink information regarding the corresponding text string.

The text track area may also include timing information and sample descriptions regarding the text strings included in the text data area. A sample description data may have font information, position information and background information regarding the text strings.

For example, timed text may have the same format as a text format which is disclosed in 3GPP TS 26.245 or MPEG-4 Part-17 and is suitable for implementing the above application scenarios and supporting the above functionalities.

The file information area may also include description data of a timed text effect. Video contents included in the video data area may be reproduced in synchronization with a plurality of text strings using the timed text effect description.

The timed text effect description may include character set information, glyph information, font information, text color information, closed caption information, dynamic highlight information, karaoke, text rendering position information and text composition information.

Dynamic highlighting may be implemented by using a combination of timed text effect and the above-described transition effect. For example, text strings with two different colors may be displayed at the same location, overlapping each other. When a highlighting function starts, whichever of the test springs is on top of the other may wipe out from left to right. For this, "barWipe" may be designated as a type, and leftToRight may be designated as a subtype.

The text data area may include a plurality of text data, each having a plurality of text samples. In this case, the media information area may include a number of text track areas respectively corresponding to the plurality of text data. Each of the text track areas may include a sampling description and timing information of corresponding text data.

Image data included in the image data area may be used as a background image for a menu displayed according to menu description data. As described above, an animation effect specified in the menu description data may be applied to the image data included in the image data area.

Video data included in the video data area may be compressed data obtained using various video coding methods such as MPEG-4 Advanced Video Coding (AVC), MPEG-2, H.263, or MPEG-4 Part 2. In particular, the video data included in the video data may be compressed data obtained using a video coding method specified in ITU-T H.264.

Audio data included in the audio data area may be compressed data obtained using various audio coding methods such as MP3 or Advanced Audio Coding (AAC). In particular, the audio data included in the audio data area may be compressed data obtained using MPEG-4 High Efficiency Advanced Audio Coding (HE-AAC). Alternatively, the audio data included in the audio data area may be compressed data obtained using a scalable audio coding method such as Bit Sliced Arithmetic Coding (BSAC).

Image data included in the image data area may be compressed data obtained using a coding method such as Joint Picture Expert Group (JPEG).

FIG. 8 illustrates a block diagram of an apparatus (hereinafter referred to as the multimedia data encoding apparatus) for encoding multimedia data according to an embodiment of the present invention. The multimedia data encoding apparatus may include a file structure generator 100, a multimedia track generator 110, a description area generator 120 and a metadata generator 130.

The file structure generator 100 generates a multimedia file including a file type area, a file information area, a media information area, and a media area.

The multimedia track generator 110 generates a plurality of data areas in a media area, and generates a plurality of track areas respectively corresponding to the data areas in a media information area. Each of the data areas includes a plurality of media data. For example, the multimedia track generator 110 may generate a video track area corresponding to a video data area, an audio track area corresponding to an audio data area, a text track area corresponding to a text data area, or an image track area corresponding to an image data area.

The description area generator 120 a menu description area which includes description data for displaying a menu.

The metadata generator 130 generates metadata and stores the metadata in a file information area, a track meta area or a media meta area. Also, the metadata generator 130 may generate menu description data and store the menu description data in a menu description area.

The operations of the file structure generator 100, the multimedia track generator 110, the description area generator 120 and the metadata generator 130 may be performed in a different order from that set forth herein. In addition, the operations of at least two of the file structure generator 100, the multimedia track generator 110, the description area generator 120 and the metadata generator 130 may be performed at the same time.

FIG. 9 illustrates a block diagram of an apparatus (hereinafter referred to as the multimedia data decoding apparatus) for decoding multimedia data according to an embodiment of the present invention. Referring to FIG. 9, the multimedia data decoding apparatus may include a data input unit 200, a parser 210, a first decoder 220 and a second decoder 230. The operation of the multimedia data decoding apparatus illustrated in FIG. 9 will hereinafter be described in detail with reference to FIG. 12.

Referring to FIGS. 9 and 12, the data input unit 200 receives input multimedia data (500). The parser 210 extracts menu description data from the input multimedia data (510). The second decoder 230 displays a menu for providing an interface between a user and media data (520).

Referring to FIG. 11, a second decoder 430, which displays a menu for providing an interface between a user and media data, may include a description decoder 431 and a rendering unit 432. The description decoder 431 extracts information necessary for displaying the menu by decoding the menu description data extracted from input multimedia data, and the rendering unit 432 displays the menu based on the information extracted by the description decoder 431.

As described in the above example, the menu description data created using LASeR may include Scalable Vector Graphics (SVG) format data.

In this case, The description decoder 431 extracts Scalable Vector Graphics (SVG) format data from the description data described using a scene representation format, for example using LASeR, the Scalable Vector Graphics (SVG) format data including information necessary for displaying the menu Thus, the user may select one of a plurality of media contents included in the input multimedia data using the menu displayed by the rendering unit 432. For example, the user may select a desired content from a plurality of video contents included in a video data area using the menu displayed by the rendering unit 432.

Referring to FIGS. 9 and 12, the parser 210 extracts media content corresponding to a media content selected by the user from a media area of the input multimedia data (530).

The first decoder 220 decodes the extracted media content (540). Then, the first decoder 220 displays the media content selected by the user (550).

Referring to FIG. 11, a first decoder 420, which decodes media data, may include a video decoder 421, an audio decoder 422, a text decoder 423 and an image decoder 424. The video decoder 421, the audio decoder 422, the text decoder 423 and the image decoder 424 decode video data, audio data, text data and image data, respectively, included in a media area of input multimedia data.

FIG. 10 illustrates a block diagram of a multimedia data decoding apparatus according to another embodiment of the present invention. Referring to FIG. 10, the multimedia data decoding apparatus may include a data input unit 300, a first parser 310, a first decoder 320, a second decoder 330 and a second parser 340. The operation of the multimedia data decoding apparatus illustrated in FIG. 10 will hereinafter be described in detail with reference to FIG. 13, focusing more on the differences with the operation of the multimedia data decoding apparatus illustrated in FIG. 9.

Referring to FIGS. 10 and 13, the data input unit 300 determines whether input multimedia data includes usage history information regarding a number of actions made on the input multimedia data by a user (600).

If the input multimedia data includes usage history information, the first parser 310 extracts metadata including the usage history information from the input multimedia data, and the second decoder 330 extracts the usage history information from the metadata extracted by the first parser 310.

The first decoder 320 performs a decoding operation using the usage history information so that the play of video data can be resumed from a point of interruption of the play of the video data (610). Before performing operation 610, the multimedia data decoding apparatus may allow the user to decide whether to resume the play of the video data from the point of interruption of the play of the video data.

On the other hand, if the input multimedia data has no usage history information, it is determined whether the multimedia data decoding apparatus is capable of handling menu description data created using LASeR (620).

If the multimedia data decoding apparatus is capable of handling menu description data created using LASeR, the second decoder 330 displays a menu according to menu description data extracted by the first parser 310 (640), and the first decoder 320 decodes and thus displays a video content selected by the user (650).

If the multimedia data decoding apparatus is incapable of handling menu description data created using LASeR, the first decoder 320 decodes and thus displays a first video content of a plurality of video contents included in a video data area of the input multimedia data (630).

Even if the multimedia data decoding apparatus is capable of handling menu description data created using LASeR, operation 630 may be performed if the input multimedia data has no menu description data.

The first video content may be a video content that comes first in the video data area or a video content with a highest priority level or a video content including a main feature. The priorities among the video contents included in the video data area of the input multimedia data may be determined by the user.

The multimedia data encoding and decoding apparatuses according to the present invention may be included in a multimedia broadcast transmission/reception apparatus such as a digital audio broadcasting (DAB) or digital multimedia broadcasting (DMB) apparatus and may thus used to encode/decode audio signals or voice signals. The multimedia data encoding and decoding apparatuses according to the present invention may include a mobile communication terminal. Multimedia data having any of the above-mentioned formats may be included in a multimedia broadcast signal.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art. A bitstream obtained using the present invention may be stored in a computer-readable recording medium or may be transmitted through a wireless or wired communication network.

The multimedia data decoding apparatus according to the present invention may be included in a mobile communication terminal, a multimedia player such as a portable multimedia player (PMP), or a reproduction device such as a personal digital assistant (PDA). In addition, the multimedia data decoding apparatus according to the present invention may be realized as either a hardware device or a software program and may thus be included in a reproduction apparatus.

INDUSTRIAL APPLICABILITY

As described above, the present invention can be applied to various media data reproduction devices such as multimedia players or multimedia coding devices, and can reduce the time taken to process and transmit multimedia data.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A decoding method, implemented by a processor, comprising:
   receiving multimedia data which consists of a file type area having file format information, a media area including a plurality of video contents and a plurality of audio contents, a media information area including a plurality of video track areas respectively corresponding to the video contents and a plurality of audio track areas respectively corresponding to the audio contents, and a file information area including a menu description area including description data for displaying a menu that provides an interface between a user and media data in the media area;
   extracting the description data from the multimedia data, the description data being described using Lightweight Application Scene Representation (LASeR);
   decoding the extracted description data by extracting scalable vector graphics format data from the description data;
   displaying a menu using the description data; and
   decoding media data extracted from the media area based on the menu,
   wherein each of the video track areas and the audio track areas comprises at least one of temporal information and spatial information of a corresponding content, and the description data identifies basic shape elements used for menu buttons, each video track area includes a track meta area, the track meta area includes XML format data on the media data.

2. The decoding method of claim 1, wherein the media area further comprises a text data area including a text content, and the media information area further comprises a text track area corresponding to the text content.

3. The decoding method of claim 2, wherein the text content includes information regarding a subtitle for translation.

4. The decoding method of claim 2, wherein the text content is stored using a timed text format.

5. The decoding method of claim 4, wherein the timed text format consists of a sample description and text samples, each of the text samples including a text modifier.

6. The decoding method of claim 5, wherein the sample description includes information regarding at least one of a font, a position, and background color of the text content, and the text modifier includes information regarding text string included in the text sample.

7. The decoding method of claim 1, wherein the media area further comprises an image data area which includes image data, and background image of the menu is generated by applying the animation effect to the image data in the image data area.

8. An encoding method, implemented by a processor, comprising:
   generating a file type area including information regarding a format of multimedia data;
   generating a media area which comprises a plurality of video contents and a plurality of audio contents;
   generating a media information area which includes a plurality of video track areas respectively corresponding to the video contents and a plurality of audio track areas respectively corresponding to the audio contents respectively; and
   generating a file information area which comprises a menu description area including description data for displaying a menu, the menu providing an interface between a user and media data in the media area and the description data being described using Lightweight Application Scene Representation (LASeR),
   wherein each of the video track areas and the audio track areas comprises at least one of temporal information and spatial information of a corresponding content, and
   the description data identifies basic shape elements used for menu buttons, the multimedia data consists of the file type area, file information area, media information area and the media area, each video track area includes a track meta area, and the track meta area includes XML format data on the media data.

9. The decoding method of claim 1, wherein the media area further comprises a text data area including a text content, and the media information area further comprises a text track area corresponding to the text content.

10. A decoding apparatus comprising:
    a processor coupled to a memory;
    a data input unit which receives multimedia data, via the processor, the multimedia data consisting of a file type area having file format information, a media area including a plurality of video contents and a plurality of audio contents, a media information area including a plurality of video track areas respectively corresponding to the video contents and a plurality of audio track areas respectively corresponding to the audio contents, and a file information area including a menu description area including description data for displaying a menu that provides an interface between a user and media data in the media area;
    a first decoder which displays a menu that provides an interface between a user and media data in the media area using the description data, the description data being described using Lightweight Application Scene Representation (LASeR); and
    a second decoder which decodes a media data extracted from the media area based on the menu,
    wherein each of the video track areas and the audio track areas comprises at least one of temporal information and spatial information of a corresponding content, and the description data identifies basic shape elements used for menu buttons, each video track area includes a track meta area, the track meta area includes XML format data on the media data.

11. The decoding apparatus of claim 10, wherein the media area further comprises a text data area including a text content, and the media information area further comprises a text track area corresponding to the text content.

12. An encoding apparatus comprising:
- a processor coupled to a memory;
- a multimedia track generator which generates, via the processor, a plurality of video track areas respectively corresponding to a plurality of video contents and a plurality of audio track areas respectively corresponding to a plurality of audio contents;
- a description area generator which generates a menu description area including description data for displaying a menu, the menu providing an interface between a user and media data and the description data being described using Lightweight Application Scene Representation (LASeR); and
- a file structure generator which generates the multimedia data consisting of a file type area having file format information, a file information area including the menu description area, a media information area including the plurality of video track areas and the plurality of audio track areas, and the media area including the plurality of video contents and the plurality of audio contents, wherein each of the video and audio track areas comprises at least one of temporal information and spatial information of a corresponding content, and the description data identifies basic shape elements used for menu buttons, and wherein the multimedia data consists of the file type area, file information area, media information area, and the media area, each video track area includes a track meta area, and the track meta area includes XML format data on the media data.

13. The decoding method of claim 1, wherein the multimedia data is received as a broadcast signal.

14. The decoding method of claim 1, wherein the multimedia data is stored in a digital medium.

* * * * *